United States Patent Office 3,317,454
Patented May 2, 1967

3,317,454
VULCANIZABLE COMPOSITIONS COMPRISING OLEFINIC POLYMERS AND VULCANIZATES OBTAINED THEREFROM
Giovanni Pedretti, Ferrara, Italy, assignor to Montecatini Edison S.p.A., Milan, Italy
No Drawing. Filed Feb. 19, 1964, Ser. No. 345,845
Claims priority, application Italy, Feb. 21, 1963, 3,566/63
12 Claims. (Cl. 260—33.4)

This invention is directed to the preparation of vulcanizable compositions and more specifically to vulcanizable olefinic polymers and the vulcanizates obtained therefrom. More specifically, this invention is directed to vulcanizable compositions comprising olefinic polymers and copolymers of ethylene with higher alpha-olefins and in particular to copolymers of ethylene and propylene. Still more specifically, this invention is directed to vulcanizable compositions comprising olefinic polymers and copolymers containing an effective amount of a cross-linking agent such as alpha, alpha'-bis (tertiary butyl-peroxy) para-diisopropylbenzene or a mixture of said para-diisopropylbenzene with the meta-isomer. This invention is particularly directed to polymeric-olefinic vulcanizable compositions and to the vulcanizates obtained therefrom which contain in addition to the cross-linking agent a small but effective amount of an anti-blooming agent effective to prevent the formation of white, thin layers on the surface of the vulcanized product.

The use of diperoxides and alkyl-diperoxides as cross-linking agents for olefinic polymers containing a reinforcing filler has been suggested. It has been observed, however, that in vulcanizates prepared from these olefinic polymers or copolymers containing diperoxides such as alpha, alpha'-bis (tertiary butyl-peroxy) para-diisopropylbenzene that a blooming effect appears which is a progressive formation of a thin-white veil, or layer on the surface of the vulcanized article. In particular, vulcanizates containing the para-diperoxide have been known to exhibit an extensive and abundant blooming of microcrystals strongly adhering to the surface of the vulcanizate. This blooming has a tendency to increase over a period of time with ageing. In contrast, however, vulcanizates obtained from polymers containing meta-diperoxide have been found not to exhibit any blooming, whereas those vulcanizates containing a mixture of meta and para-diperoxide exhibit blooming in the form of a powder. This powder adheres to the vulcanizate and increases as the para-isomer content in the mixture increases.

In addition, it was found that no blooming occurred when saturated elastomeric and plastomeric materials were cross-linked with organic per-compounds such as alkyl arylalkyl monoperoxides, di-arylalkyl monoperoxides or the alkyl-diperoxides having low melting points. Moreover, no blooming occurred even in the presence of a vulcanizing-aid such as sulfur. More specifically, no blooming was found to occur either in the crude or on the finished vulcanizates of ethylene-propylene copolymers. These copolymers were vulcanized with small amounts of sulfur in the presence of the above-mentioned percompounds. The various peroxides tested included tertiary butyl-cumylperoxide having a melting point of 18° C., dicumylperoxide having a melting point of 40° C., 2,5 dimethyl-2,5 bis(tertiary butylperoxy) hexane having a solid point of 8° C.

The blooming on the vulcanizates is not a technical inconvenience or disadvantage, but it is unacceptable from a commercial point of view, particularly on those manufactured articles which are to be sold to the public. A suitable method for avoiding the blooming problem can be accomplished by using mechanical treatments. These treatments include, for example, brushing or flushing the vulcanizate with a steam jet. This, however, will only remove the blooming temporarily, unless the treatment is carried out after a period of time sufficient to allow the crystals to surface completely. In any case, however, these treatments are unsatisfactory in that they are not economical.

In contrast to the above-mentioned organic peroxides, which do not cause blooming, the blooming effects observed on vulcanizates obtained by using alpha, alpha'-bis (tertiary butyl-peroxy) para-diisopropylbenzene as cross-linking agents are quite substantial. This is probably due to the fact that the decomposition product of the para-benzene diperoxide possess a considerably higher melting point than the decomposition products of the above-mentioned monoperoxides or alkyl diperoxides and consequently do not remain dissolved in the vulcanizate. Moreover, in comparing the melting points of the decomposition products of the para-benzene diperoxide with those of the corresponding decomposition products of the meta-benzene diperoxide, it was found that the melting points of the latter are lower. Thus, it is understood why there was no blooming on the vulcanizates when the meta-diperoxides were used in place of the para-diperoxides. The data relating to a number of decomposition products of para and meta-diperoxides include the following:

|  | Melting point ° C. |
|---|---|
| Alpha,alpha'-bis(oxy)-p-diisopropylbenzene | 141–142 |
| p-Diacetyl-benzene | 112–114 |
| Alpha,alpha'-bis(oxy)-m-diisopropylbenzene | 135 |
| m-Diacetyl-benzene | 32 |

Accordingly, it is an object of this invention to provide a vulcanizable composition comprising olefinic polymers and copolymers which contain cross-linking and anti-blooming agents.

It is another object of this invention to provide a vulcanizable composition comprising olefinic polymers and copolymers, a reinforcing filler, a cross-linking agent and an anti-blooming agent.

It is still another object of this invention to provide a method of preventing blooming of vulcanizates prepared from a vulcanizable composition comprising olefinic polymers and copolymers.

It is still a further object of this invention to provide a method of preventing blooming on vulcanizates prepared from a vulcanizable composition containing olefinic polymers and a para-diperoxide or a mixture of meta and para-diperoxides.

These and other objects of the invention will become apparent from a further and more detailed description as follows:

It has been discovered, quite unexpectedly, that the blooming effects on vulcanizates comprising olefinic polymers and copolymers can be avoided by utilizing an anti-blooming agent in combination with a cross-linking agent which consists of a para-diperoxide or a mixture of meta and para-diperoxides. More specifically, this anti-blooming agent should be compatible with saturated elastomers or plastomer and should not deteriorate in the course of the vulcanization process. Moreover, it is important to utilize an anti-blooming agent which will not interfere with the function of the peroxy cross-linking agent. In other words, the anti-blooming agent should be a compound which does not behave as a free-radical deactivator. Thus, in accordance with these requirements it has been found that vulcanizates or vulcanized articles can be prepared on which there appears no blooming by utilizing in combination with the cross-linking agent an anti-blooming agent which is selected from the group consisting of di-alcohols such as alkylene glycols, polyalkylene oxides, aliphatic polyalcohols such as glycerine and erythrite and mixtures of said aliphatic polyalcohols in equal parts by weight with silicic acids, alkylene glycols, and polyalkylene oxides. If a mixture of the anti-blooming agent is desired, it is important to use the aliphatic polyalcohol in equal parts by weight with the silicic acid, alkylene glycol or polyalkylene oxide.

The amount of the anti-blooming agent to be used in the vulcanizable composition in accordance with this invention ranges from about 0.5 to 1.5 parts by weight based on the weight of the para-diperoxide employed. These proportions also hold true in those instances where the cross-linking agent consists of a mixture of the para-diperoxide with its mesta-isomer. Since the diperoxide is used in amounts from 2 to 5 parts by weight per 100 parts of copolymer, the amount of anti-blooming agent in respect to copolymer is comprised between 1 and 7.5 parts by weight.

If desired, a vulcanization aid such, as sulfur may be added to the vulcanizable composition in an amount ranging from about 0.6 to 3.0 and more preferably in an amount ranging from 1.6 to 2.0 gram atoms per mole of the diperoxide. Other coadjuvants which may be employed in the vulcanizable composition include quinone dioxime, furfuramide, furfural, furfuryl alcohol, etc. In addition to the vulcanization aids other additives which may be used include plasticizer and the anti-oxidants normally used in the rubber industry provided, however, that they do not interfere with the function of the diperoxide.

The reinforcing filler to be used includes all types of carbon black or other fillers imparting a dark color to the manufactured article. These fillers are normally admixed with the polymer or copolymer in an amount ranging from about 10 to 100 parts by weight based on the weight of the polymer.

The anti-blooming agents include, for example, any of the known aliphatic polyalcohols such as glycerin and erythrite which may be used either alone or in combination, in equal parts by weight, with silicic acid, alkylene glycols, and polyalkylene oxides. The dialcohols are alkylene glycols and include ethylene glycol, propylene glycol, etc., and the polyalkylene oxides include polyethylene oxide, polypropylene oxides, etc. These anti-blooming agents and the various mixtures thereof may be used satisfactorily for co-vulcanizing compositions of the saturated ethylene-alphaolefin copolymers alone or with other saturated and unsaturated elastomers. In fact, there is no limitation which needs to be imposed on the type of elastomers except that they have the ability to undergo vulcanization with the para-diperoxide in accordance with this invention.

The relative proportion of the aliphatic polyalcohol when used in an admixture with the silicic acid, alkylene glycol or polyalkylene oxide is not critical and may vary within a wide range, since it is possible to use the polyalcohol alone. Likewise, the relative proportion of the para and meta-diperoxide in the vulcanizable composition is not critical, since it is the presence of the para-diperoxide on which the amount of anti-blooming agent is based.

Outstanding results have been obtained by using these anti-blooming agents in the vulcanization of saturated and amorphous copolymers of ethylene with propylene and/or butene. The preferred copolymers have an ethylene molar content ranging from about 20% to 80% and a molecular weight ranging from about 60,000 to 600,000 and more preferably from about 100,000 to 600,000. The vulcanizable compositions of this invention are vulcanized by heating the mass in a press, in an autoclave or in an extruder at a temperature ranging from about 140° C. to 180° C.

The following examples and tables are recited to more particularly point out and illustrate the invention without limiting the scope.

*Example 1*

An ethylene-propylene copolymer having an ethylene molar content of 55% and a Mooney viscosity of 60 ML (1+4) at 100° C. was mixed with Vaseline oil and various other ingredients as set forth in mixtures 1–5 of Table 1. Plates of 120 x 120 x 2 mm. from which "C" type specimens were obtained, according to ASTM–D 412, were vulcanized by molding under the conditions indicated in the table.

The mechanical characteristics of the vulcanizates were determined in an Amsler dynamometer having a shifting rate of the clamps with respect to one another of 500 mm./minute. The residual elongation was evaluated on specimens kept under stretching at 200% for 1 hour and measured one minute after recovery.

The results of the tests and the observations therefrom on the blooming effects are given in Table 1.

TABLE 1

|  | 1 | 2 | 3 | 4 | 5 |
|---|---|---|---|---|---|
| Composition of the mixtures (parts by weight): |  |  |  |  |  |
| Ethylene-propylene copolymer | 75 | 75 | 75 | 75 | 75 |
| Vaseline Oil | 25 | 25 | 25 | 25 | 25 |
| HAF Carbon Black | 50 | 50 | 50 | 50 | 50 |
| Anti-oxidant | 0.5 | 0.5 | 0.5 | 0.5 | 0.5 |
| Sulfur | 0.6 | 0.6 | 0.6 | 0.6 | 0.6 |
| Alpha, alpha'-bis(tert.butyl-peroxide)-p-diisopropylbenzene | 3 | 3 | 3 | 3 | 3 |
| Aliphatic polyalcohol [a] |  | 1 |  |  |  |
| Glycerin |  |  | 2 |  |  |
| Ethylene glycol |  |  |  | 2 |  |
| Polyethylene-oxide [b] |  |  |  |  | 1 |

VULCANIZATION CONDITIONS: 165° C./40′

| Mechanical Characteristics: |  |  |  |  |  |
|---|---|---|---|---|---|
| Tensile strength, kg./cm.$^2$ | 167 | 170 | 164 | 169 | 164 |
| Elongation at break, percent | 420 | 435 | 415 | 460 | 440 |
| Modulus at 300%, kg./cm.$^2$ | 105 | 93 | 115 | 105 | 104 |
| Residual elongation at 200%, percent | 6 | 6.5 | 6.5 | 8 | 8 |
| Blooming on the vulcanizates: |  |  |  |  |  |
| After 10 days | Very much | Almost none | Almost none | None | Little |
| After 30 days | Very much | A lot | Little | None | A lot |

[a] Activator R (Chemische Fabrik Wesseling A. G.) = mixture of equal parts of silicic acid and an aliphatic polyalcohol.
[b] Carbowax 400 (Union Carbide Chemicals Co.) = polyethylene oxide.

*Example 2*

For purposes of comparing the behavior of alpha,-alpha'-bis (tertiary butyl-peroxy)-p-diisopropylbenzene, with the corresponding meta-isomer and with a mixture of the para- and meta-isomers, compositions were prepared with the copolymer of Example 1 containing in addition a copolymer having a Mooney viscosity of 35 ML (1+4) at 100° C. The anti-blooming agents included an aliphatic polyalcohol and a poly-alkylene oxide. The vulcanizable compositions were vulcanized and the mechanical characteristics of the vulcanizates were determined by the same method set forth in Example 1.

The vulcanizable compositions and the results obtained therefrom are reported in mixtures 1–14 of Table 2.

TABLE 2

| | 1 | 2 | 3 | 4 | 5 |
|---|---|---|---|---|---|
| Composition of the mixtures (parts by weight): | | | | | |
| Ethylene-propylene copolymer (ML 60) | 75 | 75 | 75 | 75 | 75 |
| Vaseline Oil | 25 | 25 | 25 | 25 | 25 |
| Ethylene-propylene copolymer (ML 35) | | | | | |
| HAF carbon black | 50 | 50 | 50 | 50 | 50 |
| Anti-oxidant | 0.5 | 0.5 | 0.5 | 0.5 | 0.5 |
| Sulfur | 0.5 | 0.5 | 0.5 | 0.5 | 0.5 |
| p-Diperoxide | 2.5 | 2.5 | | | |
| m-Diperoxide | | | 2.5 | 2.5 | |
| m- and p-Diperoxide mixture (65–35%) | | | | | |
| Dicumyl-peroxide | | | | | 2.5 |
| Aliphatic polyalcohol [a] | | 2.5 | | 2.5 | |
| Polyalkylene oxide [b] | | | | | |

VULCANIZATION CONDITIONS: 165° C./40′

| | 1 | 2 | 3 | 4 | 5 |
|---|---|---|---|---|---|
| Mechanical characteristics: | | | | | |
| Tensile strength, kg./cm.² | 169 | 154 | 161 | 157 | 160 |
| Elongation at break, percent | 460 | 490 | 445 | 470 | 430 |
| Modulus at 300%, kg./cm.² | 105 | 85 | 101 | 90 | 99 |
| Residual elongation at 200%, percent | 9.5 | 10 | 8 | 9 | 8 |
| Blooming on the vulcanizates: | | | | | |
| After 8 days | | | | | |
| After 10 days | A lot | None | None | None | None |
| After 20 days | | | | | |
| After 30 days | Very much | None | None | None | Almost none |
| After 50 days | Very much | None | None | None | Little |

| | 6 | 7 | 8 | 9 | 10 |
|---|---|---|---|---|---|
| Composition of the mixtures (parts by weight): | | | | | |
| Ethylene-propylene copolymer (ML 60) | 75 | | | | |
| Vaseline Oil | 25 | | | | |
| Ethylene-propylene copolymer (ML 35) | | 100 | 100 | 100 | 100 |
| HAF carbon black | 50 | 50 | 50 | 50 | 50 |
| Anti-oxidant | 0.5 | | | | |
| Sulfur | 0.5 | 0.48 | 0.48 | 0.48 | 0.48 |
| p-Diperoxide | | 2.53 | 2.53 | | |
| m-Diperoxide | | | | 2.53 | 2.53 |
| m- and p-Diperoxide mixture (65–35%) | 2.5 | | | | |
| Dicumyl-peroxide | | | | | |
| Aliphatic polyalcohol [a] | 2.5 | | | | |
| Polyalkylene oxide [b] | | | 3 | | 3 |

VULCANIZATION CONDITIONS: 165° C./40′

| | 6 | 7 | 8 | 9 | 10 |
|---|---|---|---|---|---|
| Mechanical characteristics: | | | | | |
| Tensile strength, kg./cm.² | 150 | 168 | 160 | 171 | 167 |
| Elongation at break, percent | 480 | 300 | 320 | 310 | 320 |
| Modulus at 300%, kg./cm.² | 83 | 150 | 132 | 149 | 152 |
| Residual elongation at 200%, percent | 10 | 5 | 5 | 5 | 5 |
| Blooming on the vulcanizates: | | | | | |
| After 8 days | | A lot | None | None | None |
| After 10 days | None | | | | |
| After 20 days | | A lot | None | None | None |
| After 30 days | None | | | | |
| After 50 days | Almost none | | | | |

| | 11 | 12 | 13 | 14 |
|---|---|---|---|---|
| Composition of the mixtures (parts by weight): | | | | |
| Ethylene-propylene copolymer (ML 60) | | | | |
| Vaseline Oil | | | | |
| Ethylene-propylene copolymer (ML 35) | 100 | 100 | 100 | 100 |
| HAF carbon black | 50 | 50 | 50 | 50 |
| Anti-oxidant | | | | |
| Sulfur | 0.48 | 0.48 | 0.48 | 0.48 |
| p-Diperoxide | | | | |
| m-Diperoxide | | | | |
| m- and p-Diperoxide mixture (65–35%) | 2.53 | 2.53 | | |
| Dicumyl-peroxide | | | 4.05 | 4.05 |
| Aliphatic polyalcohol [a] | | | | |
| Polyalkylene oxide [b] | | 3 | | 3 |

TABLE 2—Continued

VULCANIZATION CONDITIONS: 165° C./40'

| Mechanical characteristics: | | | | |
|---|---|---|---|---|
| Tensile strength, kg./cm.² | 162 | 169 | 172 | 156 |
| Elongation at break, percent | 325 | 360 | 347 | 370 |
| Modulus at 300%, kg./cm.² | 151 | 126 | 138 | 118 |
| Residual elongation at 200%, percent | 5 | 5 | 5 | 6 |
| Blooming on the vulcanizates: | | | | |
| After 8 days | Almost none | None | None | None |
| After 10 days | | | | |
| After 20 days | Little | None | None | None |
| After 30 days | | | | |
| After 50 days | | | | | a See Table No. 1.  b See Table No. 1.

*Example 3*

In order to investigate the influence exerted by different amounts of the various anti-blooming agents, the copolymer as set forth in Example 1 was mixed with the various ingredients repoted in Table 3. The vulcanization and the determination of the mechanical properties of the vulcanizates were carried out in accordance with the method described in Example 1. The vulcanizable compositions and the results obtained therefrom, together with the observations of the blooming effects are given in mixtures 1–9 in Table 3.

*Example 4*

The ethylene-propylene copolymer of Example 2 having a Mooney viscosity of 35 ML (1+4) at 100° C. was mixed with the ingredients reported in Table 4. The anti-blooming substances, i.e. triethylene glycol and its effect on the vulcanizable composition was investigated in the absence of sulfur. The three diperoxides employed in Example 2 were used in this composition. The vulcanization and the determination of the mechanical characteristics of the vulcanizates were carried out in accordance with the methods described in Example 1.

TABLE 3

| | 1 | 2 | 3 | 4 | 5 |
|---|---|---|---|---|---|
| Composition of the mixtures (parts by weight): | | | | | |
| Ethylene-propylene copolymer | 75 | 75 | 75 | 75 | 75 |
| Vaseline Oil | 25 | 25 | 25 | 25 | 25 |
| HAF carbon black | 50 | 50 | 50 | 50 | 50 |
| Anti-oxidant | 0.5 | 0.5 | 0.5 | 0.5 | 0.5 |
| Sulfur | 0.6 | 0.6 | 0.6 | 0.6 | 0.6 |
| Alpha, alpha'-bis(tert.butyl-peroxy)-p-diisopropylbenzene | 3 | 3 | 3 | 3 | 3 |
| Ethylene glycol | | 0.5 | 1 | 1.5 | 2 |
| Aliphatic polyalcohol | | | | | |

VULCANIZATION CONDITIONS: 165° C./40'

| Mechanical characteristics: | | | | | |
|---|---|---|---|---|---|
| Tensile strength, kg./cm.² | 168 | 166 | 161 | 165 | 169 |
| Elongation at break, percent | 413 | 435 | 415 | 460 | 460 |
| Modulus at 300%, kg./cm.² | 114 | 109 | 107 | 98 | 105 |
| Residual elongation at 200%, percent | 6 | 9.5 | 8 | 7.5 | 8 |
| Blooming on the vulcanizates: | | | | | |
| After 35 days | Very much | A lot | Little | None | None |
| After 45 days | | | | | |

| | 6 | 7 | 8 | 9 |
|---|---|---|---|---|
| Composition of the mixtures (parts by weight): | | | | |
| Ethylene-propylene copolymer | 75 | 75 | 75 | 75 |
| Vaseline Oil | 25 | 25 | 25 | 25 |
| HAF carbon black | 50 | 50 | 50 | 50 |
| Anti-oxidant | 0.5 | 0.5 | 0.5 | 0.5 |
| Sulfur | 0.6 | 0.6 | 0.6 | 0.6 |
| Alpha, alpha'-bis(tert.butyl-peroxy)-p-diisopropylbenzene | 3 | 3 | 3 | 3 |
| Ethylene glycol | | | | |
| Aliphatic polyalcohol | 0.5 | 1 | 1.5 | 2 |

VULCANIZATION CONDITIONS: 165° C./40'

| Mechanical characteristics: | | | | |
|---|---|---|---|---|
| Tensile strength, kg./cm.² | 165 | 170 | 165 | 158 |
| Elongation at break, percent | 415 | 435 | 455 | 455 |
| Modulus at 300%, kg./cm.² | 109 | 93 | 95 | 93 |
| Residual elongation at 200%, percent | 6 | 6.5 | 7 | 7.5 |
| Blooming on the vulcanizates: | | | | |
| After 35 days | Very much | None | Little | None |
| After 45 days | Very much | Very much | A lot | None |

The vulcanizable compositions and the results obtained from the test are given in mixtures 1-6 of Table 4.

TABLE 4

|  | 1 | 2 | 3 | 4 | 5 | 6 |
|---|---|---|---|---|---|---|
| Composition of the mixtures (parts by weight): |  |  |  |  |  |  |
| Ethylene-propylene copolymer | 100 | 100 | 100 | 100 | 100 | 100 |
| HAF carbon black | 50 | 50 | 50 | 50 | 50 | 50 |
| Anti-oxidant* | 0.5 | 0.5 | 0.5 | 0.5 | 0.5 | 0.5 |
| p-Diperoxide | 2.53 | 2.53 |  |  |  |  |
| m-Diperoxide |  |  | 2.53 | 2.53 |  |  |
| m- and p-Diperoxide mixture (65-35%) |  |  |  |  | 2.53 | 2.53 |
| Triethylene glycol |  | 3 |  | 3 |  | 3 |

VULCANIZATION CONDITIONS: 165° C./40′

|  | 1 | 2 | 3 | 4 | 5 | 6 |
|---|---|---|---|---|---|---|
| Mechanical characteristics: |  |  |  |  |  |  |
| Tensile strength, kg./cm.$^2$ | 130 | 113 | 120 | 102 | 127 | 107 |
| Elongation at break, percent | 330 | 425 | 348 | 465 | 360 | 340 |
| Modulus at 300%, kg./cm.$^2$ | 113 | 68 | 99 | 58 | 97 | 69 |
| Residual elongation at 200%, percent | 14 | 22 | 16 | 26 | 18 | 25 |
| Blooming on the vulcanizates: |  |  |  |  |  |  |
| After 25 days | Little | None | None | None | None | None |
| After 40 days | Little | None | None | None | Little | None |
| After 85 days | Little | None | None | None | Little | None |

[1] Flectol H (Monsanto Chemical Co.)

*Example 5*

The vulcanizable compositions given in mixtures 1-4 of Table 5 were prepared with the ethylene-propylene copolymer of Example 4. The effect of the anti-blooming agent, i.e. triethylene glycol in the presence of coagents other than sulfur, such as hydrofuramide and furfuraldazine were investigated and reported below. A mixture of the meta and para-isomers of the diperoxide as recited in Examples 2–4 were employed for the test. The vulcanization and the determination of the mechanical characteristics of the vulcanizates were carried out by the same method described in Example 1. The results of the test are recited in mixtures 1–4 of Table 5.

TABLE 5

|  | 1 | 2 | 3 | 4 |
|---|---|---|---|---|
| Composition of the mixtures (parts by weight): |  |  |  |  |
| Ethylene-propylene copolymer | 100 | 100 | 100 | 100 |
| HAF carbon black | 50 | 50 | 50 | 50 |
| Anti-oxidant* | 0.5 | 0.5 | 0.5 | 0.5 |
| m- and p-Diperoxide mixture (65-35%) | 2.53 | 2.53 | 2.53 | 2.53 |
| Hydrofuramide | 1 | 1 |  |  |
| Furfuraldazine |  |  | 0.70 | 0.70 |
| Triethylene glycol |  | 3 |  | 3 |

VULCANIZATION CONDITIONS: 165° C./40′

|  | 1 | 2 | 3 | 4 |
|---|---|---|---|---|
| Mechanical characteristics: |  |  |  |  |
| Tensile strength, kg./cm.$^2$ | 141 | 139 | 154 | 149 |
| Elongation at break, percent | 300 | 353 | 275 | 280 |
| Modulus at 300%, kg./cm.$^2$ | 139 | 110 |  |  |
| Residual elongation at 200%, percent | 10 | 14 | 6 | 7 |
| Blooming on the vulcanizates: |  |  |  |  |
| After 25 days | Little | None | Little | None |
| After 40 days | Little | None | Little | None |
| After 85 days | Little | Little | Little | Little |

*Flectol H (Monsanto Chemical Co.)

What is claimed is:

1. A vulcanizable composition comprising a copolymer of ethylene with a higher alpha-olefin containing a reinforcing filler and an effective amount of a cross-linking agent selected from the group consisting of alpha, alpha'-bis(tertiary butyl-peroxy) para-diisopropylbenzene and a mixture of said para-diisopropylbenzene with alpha, alpha'-bis(tertiary butyl-peroxy) meta-diisopropylbenzene and an effective amount of an anti-blooming agent selected from the group consisting of dialcohols, polyalkylene oxides, aliphatic polyalcohols, and mixtures of said aliphatic polyalcohols in equal parts by weight with a member selected from the group consisting of silicic acid, an alkylene glycol and a polyalkylene oxide.

2. The vulcanizable composition of claim 1 wherein said copolymer is a copolymer of ethylene with propylene or butene.

3. The vulcanizable composition of claim 1 further containing an effective amount of at least one free-radical acceptor vulcanizing aid selected from the group consisting of sulfur, quinone dioxime, furfuramide, furfural and furfuryl alcohol.

4. The vulcanizable composition of claim 1 wherein the amount of said anti-blooming agent ranges from about 0.5 to 1.5 parts by weight of the cross-linking agent.

5. The vulcanizable composition of claim 4 wherein the amount of said vulcanizing aid ranges from 0.6 to 3.0 gram atoms per mole of said cross-linking agent.

6. The vulcanizable composition of claim 1 wherein said reinforcing filler is carbon black.

7. A vulcanizable composition comprising a saturated, amorphous copolymer of ethylene and propylene, said copolymer having an ethylene molar content ranging from about 20% to 80% by weight and a molecular weight ranging from about 60,000 to 600,000, and containing a reinforcing filler and an effective amount of a cross-linking agent selected from the group consisting of alpha, alpha'-bis(tertiary butyl-peroxy) para-diisopropylbenzene and a mixture of said para-diisopropylbenzene with alpha, alpha'-bis(tertiary butyl-peroxy) meta-diisopropylbenzene and an effective amount of an anti-blooming agent selected from the group consisting of dialcohols, polyalkylene oxides, aliphatic polyalcohols, and mixtures of said aliphatic polyalcohols in equal parts by weight with a member selected from the group consisting of silicic acid, an alkylene glycol and a polyalkylene oxide.

8. The vulcanizable composition of claim 1 wherein said anti-blooming agent is glycerin.

9. The vulcanizable composition of claim 1 wherein said anti-blooming agent is a mixture of silicic acid and an aliphatic polyalcohol.

10. The vulcanizable composition of claim 1 wherein said anti-blooming agent is a mixture of ethylene glycol and an aliphatic polyalcohol.

11. The vulcanizable composition of claim 1 wherein said anti-blooming agent is a mixture of polyethyleneoxide and an aliphatic polyalcohol.

12. A non-blooming vulcanized article obtained by vulcanizing the composition of claim 1.

No references cited.

MORRIS LIEBMAN, *Primary Examiner.*

J. S. WALDRON, S. L. FOX, *Assistant Examiners.*

UNITED STATES PATENT OFFICE
CERTIFICATE OF CORRECTION

Patent No. 3,317,454                                                    May 2, 1967

Giovanni Pedretti

It is hereby certified that error appears in the above numbered patent requiring correction and that the said Letters Patent should read as corrected below.

Column 3, line 13, for "mesta-isomer" read -- meta-isomer --; line 25, for "aids" read -- aids, --; column 4, line 72, for "alpha,-" read -- alpha, --; columns 7 and 8, in TABLE 2, Continued, fifth column, line 1 thereof, for "156" read -- 159 --; column 7, line 24, for "repoted" read -- reported --; columns 7 and 8, in TABLE 3, first column, line 10 thereof, for "Aliphatic polyalcohol" read -- Aliphatic polyalcohol [a] --; columns 7 and 8, after TABLE 3, insert the following footnote:

[a] See TABLE 1, footnote a.

column 9, TABLE 4, in the footnote, for "[1]Flectol H" read -- *Flectol H --.

Signed and sealed this 21st day of November 1967.

(SEAL)
Attest:

EDWARD M. FLETCHER, JR.                              EDWARD J. BRENNER
Attesting Officer                                           Commissioner of Patents